UNITED STATES PATENT OFFICE.

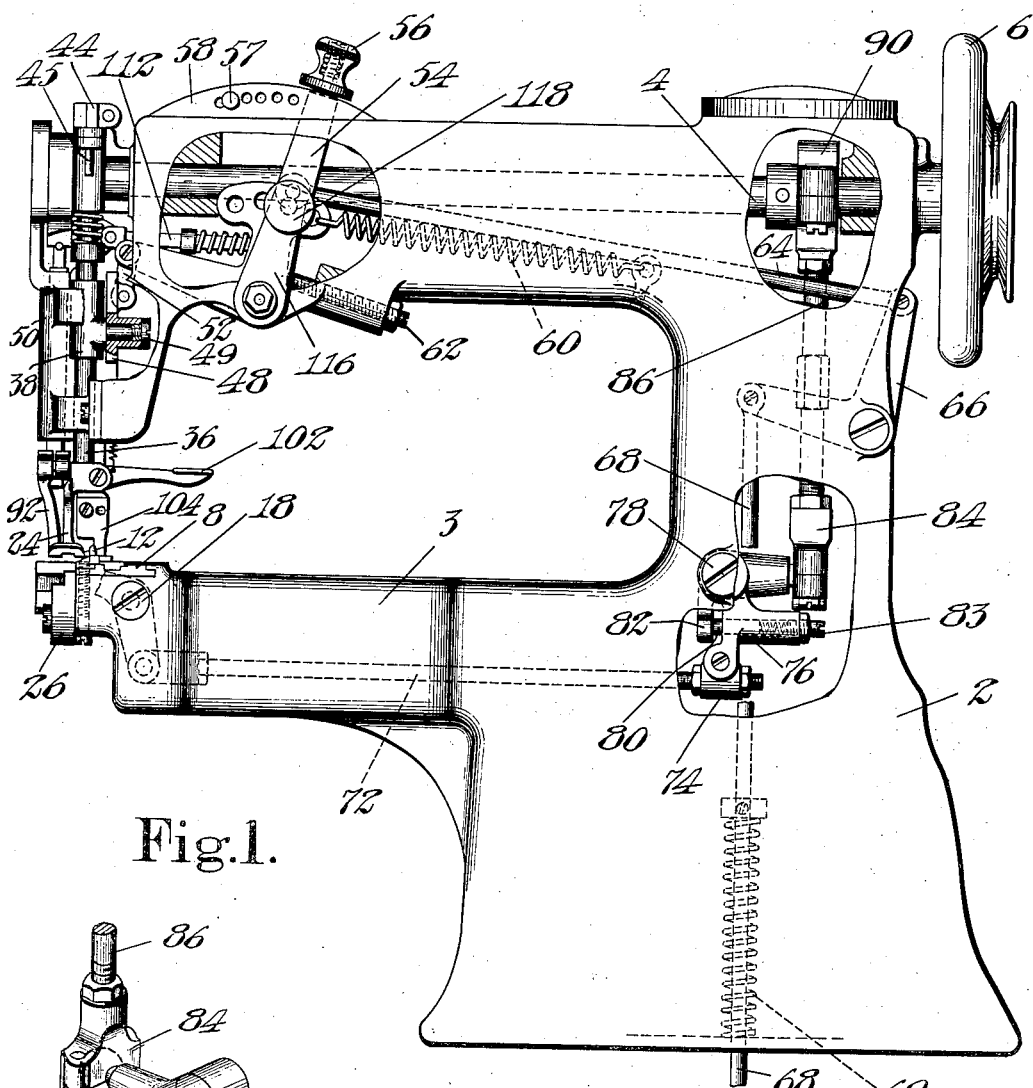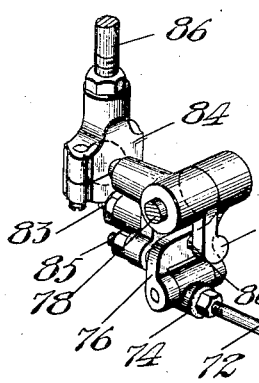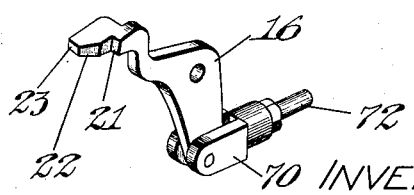

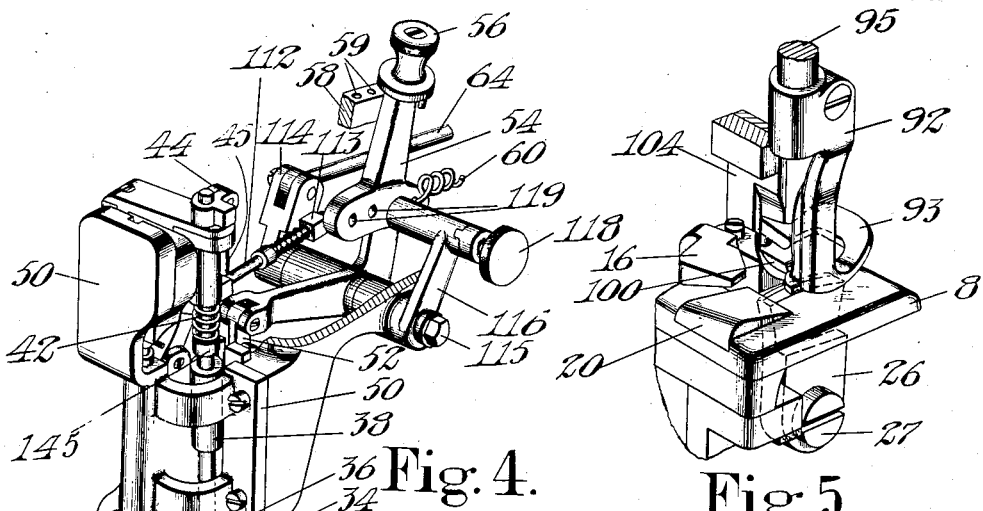

PERLEY R. GLASS, OF BROOKLINE, MASSACHUSETTS, ASSIGNOR TO P. R. GLASS COMPANY, OF BOSTON, MASSACHUSETTS, A CORPORATION OF MASSACHUSETTS.

FOLDING-MACHINE.

1,304,472.      Specification of Letters Patent.      Patented May 20, 1919.

Application filed January 30, 1915. Serial No. 5,245.

*To all whom it may concern:*

Be it known that I, PERLEY R. GLASS, a citizen of the United States, residing at Brookline, in the county of Norfolk and State of Massachusetts, have invented certain Improvements in Folding-Machines, of which the following description, in connection with the accompanying drawings, is a specification, like reference characters on the drawings indicating like parts in the several figures.

This invention relates to folding machines of the step-by-step type and the principal object of the invention is to provide a machine for folding vamps of all descriptions including those which may be operated on in a flat condition and also closed vamps which are to be folded in accordance with the method of my prior Patent No. 1,102,494. Many features of the invention, however, may be embodied with good advantage in folding machines intended for all classes of work.

One feature of the invention comprises a hammer of improved construction. In folding machines as heretofore constructed the edge of the work is liable to be stretched by the tension to which it is subjected between the point at which it is bent up and the point at which it is pressed down flat upon the body of the work. It has been found that this stretching may be eliminated or greatly lessened by employing a hammer so shaped as to engage the folded margin at first only adjacent to the fold vertex leaving the remainder of the margin free to take that position which will reduce the strain to a minimum. As herein shown the hammer is so shaped as to act upon a portion of the fold in the manner stated and then, after the work has been advanced one step farther, to engage the entire width of the fold and press it into a flat condition.

Another feature of the invention relates to improved folding mechanism which, as herein shown, includes a pair of coöperating elements arranged to form a crease in the work for determining the fold line. As herein shown these comprise an oscillatory block having a beveled work engaging edge and an oscillatory feed foot having a projection shaped to correspond to the beveled edge. Another feature of the feeding mechanism consists in the provision of an adjustable sleeve which is arranged to act as the fulcrum of the oscillating feed foot. This construction has been found to possess many structural advantages being capable of accurate and rapid adjustment while the machine is in operation and of a generally reliable character.

Another feature of the invention comprises a presser foot having a portion located adjacent to the edge gage in position to engage the work alongside the snipping knife. In the illustrative machine this foot rises and falls in the usual manner but never rises above the top of the edge gage. Besides serving the usual function of a presser foot, it thus acts both as a stripper for the knife and as a means for preventing the edge of the work from riding over the top of the edge gage.

Other features of the invention relate to novel mechanism for controlling the action of the feeding mechanism and of the slitting mechanism. Preferably the machine is arranged normally to operate with a maximum feed or spacing and with the slitting mechanism inoperative. In approaching a curved edge the operator frequently desires to reduce the spacing and throw the slitting mechanism into operation. This contingency is provided for, in accordance with another feature of the present invention, by equipping the machine with treadle controlled means at all times controllably connected with the slitting mechanism and including means for temporarily locking the spacing lever thereto. In order to adapt the machine for folding curves of various radii the connection between the treadle operated mechanism and the spacing lever is made adjustable so that the operator can simultaneously render the slitting mechanism operative and reduce the spacing to a predetermined variable extent.

These and other features of the invention will be best understood and appreciated from the following description of a preferred embodiment thereof selected for purposes of illustration and shown in the accompanying drawings, in which,—

Figure 1 is a view of the machine in front elevation, portions of the frame being broken away;

Fig. 2 is a view in perspective of part of the hammer driving mechanism;

Fig. 3 is a view in perspective of the hammer;

Figs. 4 to 8 are views in perspective showing portions of the instrumentalities which operate upon the work;

Fig. 9 is a sectional view of the feeding devices and associated parts;

Fig. 10 is a view in elevation, partly in section, of the lower feeding block and associated parts;

Fig. 11 is a perspective view of the portions of the presser foot and feed foot driving connections;

Figures 12, 13, 14:
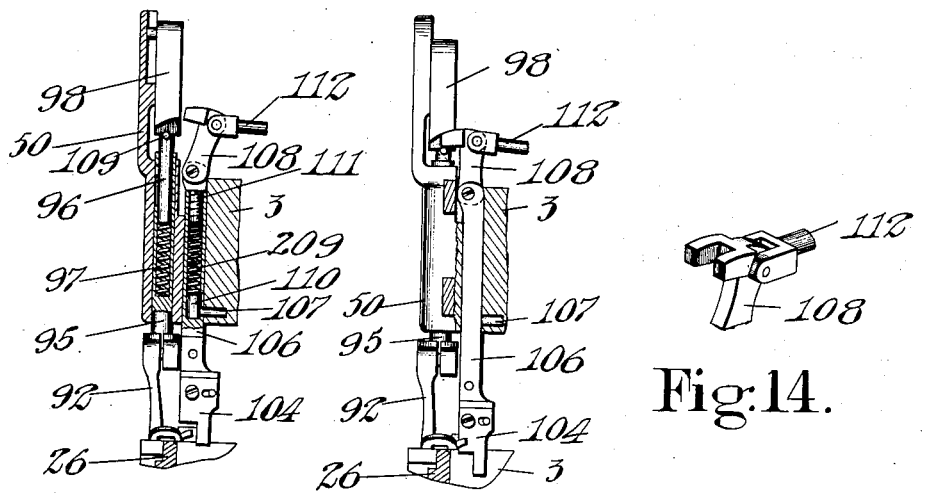
Fig. 12 and Fig. 13 are views in elevation, partly in section, showing the presser foot and snipping knife mechanisms.
Fig. 14 is a view in perspective of part of the snipping knife driving mechanism.

The frame 2 is formed with two parallel horizontally projecting arms in the upper of which is journaled the main shaft 4 carrying at its outer end a driving pulley 6. Suitable clutch mechanism may be provided for starting and stopping the main shaft but as this forms no part of the present invention it is omitted for the sake of clearness.

The lower arm 3 of the frame is substantially cylindrical in shape and of relatively small cross section so that it may be passed through a closed vamp when such work is to be done. At the outer end of the arm 3 is secured a stationary work plate 8 to which are secured the stationary instrumentalities of the machine.

The first of these instrumentalities to act upon the work is the gage for determining the width of the margin to be folded. As herein shown the gage comprises an adjustable block 10 having an upstanding projection 12 against which the unfolded edge of the work is intended to run as shown in Fig. 7. The work plate 8 is recessed to receive the gage block 10 and the latter is adjustably held in place by a screw and slot connection with the work plate 8.

At the rear of the gage 12 is located the stationary turning device or plow 14 which acts to bend the edge upwardly and partially form the fold. This member also is secured to the stationary work plate 8.

Beyond the plow 14 the work plate 8 is slotted to permit the passage of the shank of the hammer 16 which is pivoted below the work plate 8 upon a transverse stud 18. Coöperating with the hammer 16 is the stationary anvil 20 which as shown in Figs. 5 and 6 is permanently secured and held in place by a recess in the work plate 8. The anvil, for the purpose of relieving the strain in the edge during the folding operation, has its work supporting face sloped downwardly toward the on-coming work and the work engaging face of the hammer 16 is correspondingly sloped. The portion 21 of the hammer 16 which first acts upon the work as it leaves the plow 14 extends forwardly only far enough to engage or bite the partially turned margin of the work close to the fold vertex as clearly shown in Fig. 17. It acts therefore to complete and stick down only a very narrow portion of the folded margin leaving the remainder free to take that position which will produce the minimum strain in the edge. Next to the short portion 21 of the hammer is a portion 22 having a vertical edge which is inclined to the direction of feed and finally there is the portion 23 which is of sufficient length to extend completely across the folded margin of the work. The action of the hammer as the work is progressively fed beneath it is to bring the partially folded margin gradually and progressively into place upon the body of the work, thus relieving the work in a large measure of the strain which otherwise would occur in the margin between the point on the plow 14 where it is turned upwardly and the point under the hammer where it is pressed down flat.

The work is advanced through the machine by an oscillating and reciprocating feed foot 24 and an oscillating feed block 26. The feed block 26 is pivoted beneath the work plate 8 upon a stud 27 set in the end of the arm 3. It is of segmental shape and at its upper edge passes through a slot in the work plate 8 standing slightly above the surface thereof as shown in Fig. 9. The feed block 26 is not driven except through the work and is free to oscillate in accordance with the movement of the work. It is normally held toward the right, see Fig. 10, by a spring plunger 28 mounted in the end of the arm 3 and bearing against the rear side of the block 26. Its initial position is determined by a pin 29 set in the block 26 and arranged to strike a rubber pad 30 located beneath the spring plunger 28. It will be seen therefore that the block 26 is free to swing toward the left but will be immediately returned to its initial position, in which it is illustrated in Fig. 10, by the spring plunger 28.

Figure 15:
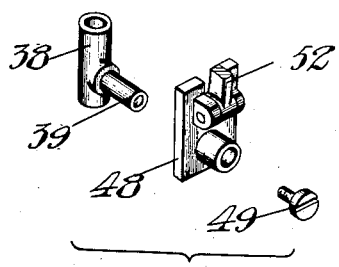
Fig. 15 is a view in perspective of the shiftable fulcrum parts of the feed foot.

The feed foot 24 which coöperates with the feed block 26 has a split hub 34 by which it is clamped in place upon the lower end of a vertical spindle 36. The spindle 36 passes through a sleeve 38 which constitutes an adjustable fulcrum for the feed foot. At its upper end the spindle 36 passes through a bore formed in one side of the cam follower frame 40 in which rotates a cam 41 on the main shaft 4. The cam 41 is so shaped as to oscillate the feed foot back and forth and also elevate and depress the same so as to bring it into engagement with the work at the beginning of the feeding operation and hold it out of engagement during its reverse movement. A spring 42 which is interposed between a collar 145 on the spindle 36 and the bottom of the follower frame 40 tends to force the feed foot downwardly making its engagement with the work of a yielding character so that if a thick place is encountered the foot may yield upwardly against the compression of the spring. The spindle 36 passes entirely through the follower frame 40, as shown in Fig. 4, and is provided at its upper end with a clamped block 44 having a downwardly extending guide pin 45 which reciprocates through an opening 46 in the frame 40 and so prevents twisting of the spindle 36. The block 44 which is adjustably secured to the spindle 36 also determines its lowermost or initial position by engaging with the top of the follower frame 40. If, therefore, it is desired to render the pressure of the feed foot light the block 44 will be loosened and the spindle 36 raised slightly whereupon the block 44 may again be clamped in position to hold the spindle slightly higher than it was before. The sleeve 38 is mounted for oscillation in a carrier slide 48 and to this end has an outwardly projecting hub 39, as shown in Fig. 15, which extends through a perforated boss on the slide 48, the parts being held in place by a screw 49 threaded into the end of a hub 39.

The slide 48 is adjustably mounted in guideways formed partly in the front of the upper overhanging arm of the frame and partly by a housing 50 which is secured to the end of the arm. At its rear side the slide 48 is pivotally connected to the lower end of a link 52 which, at its upper end, is connected to the forwardly extending arm of a bell crank spacing lever 54. The other arm of the lever 54 extends upwardly through a slot in the upper arm of the machine where it is provided with a locking head 56. The upper arm of the frame carries a curved plate 58 having a series of holes 59 in its upper surface to receive pins projecting downwardly from the locking head 56. The latter is normally pressed into engagement with the curved plate 58 by a spring shown in dotted lines in Fig. 1. By lifting the head 56 the lever 54 is free to be moved to raise or lower the slide carrier 48 and so carry the fulcrum of the spindle 36 nearer to or farther from the point at which motion is applied by the cam 41. The extent of the feeding steps is therefore correspondingly increased or decreased.

If it is desired to maintain the feeding mechanism under the immediate control of the operator through a treadle the locking head 56 may be raised and given a quarter turn carrying the locking pins out of range of the holes 59 so that the bell crank spacing lever 54 is at all times free to be moved by treadle connections presently to be described.

Secured between an intermediate point on the upstanding arm of the bell crank spacing lever 54 and an eye set in the frame is a tension spring 60 which tends always to swing the bell crank spacing lever 54 toward the right, Fig. 1, into a position which corresponds with the maximum spacing. This position may be regulated and the extent of the maximum feed adjusted by means of a stop screw 62 set in the under side of the upper arm in the path of the lever 54.

The hammer 16 which has already been discussed is actuated from the shaft 4 by mechanism which will now be described. At its lower end the hammer 16 is pivotally connected to a forked head 70 adjustably secured to the forward end of a rod 72. At its rear end the rod 72 carries an adjustable sleeve 74. The sleeve 74 is pivotally connected to a forked arm 76 pivoted to swing about the axis of a transverse stud 78 which passes through the frame 2. The arm 76 carries a spring pressed plunger 80 mounted in a suitable barrel casing. A bell crank lever 82 is also pivoted upon the stud 78 and one arm thereof is engaged by the spring plunger 80 in the arm 76. The other arm of the lever 82 extends rearwardly and is connected through a ball and socket joint with a head 84 adjustably mounted on the lower end of a vertical eccentric rod 86. At its upper end the rod 86 is threaded into an eccentric strap 90 which encircles an eccentric, not shown, on the shaft 4. The eccentric rod 86 has right and left hand threads formed on its respective ends and a square portion by which it may be engaged and turned so that its effective length may be regulated and the path of the hammer 16 thereby adjusted. The interposition of the spring plunger 80 in the driving connection of the hammer limits the pressure thereof and permits yielding in case a thick place in the work is encountered. The compression of the spring which acts upon the plunger 80 may be regulated by a set screw 83 threaded into a boss on the arm 76 as shown in Fig. 1. To the rear of the boss on the arm 76 which carries the spring plunger 80 and located on a part of the bell crank lever 82 is a second smaller boss through which extends an adjusting screw 85 bearing against a flange or web extending transversely of the arm 76 as shown in Fig. 2. When the screw 85 is turned inwardly it relatively moves the parts 82 and 76 in opposition to the spring plunger 80. The screw 85 therefore affords additional means for conveniently adjusting the path of the hammer 16.

Figure 16:
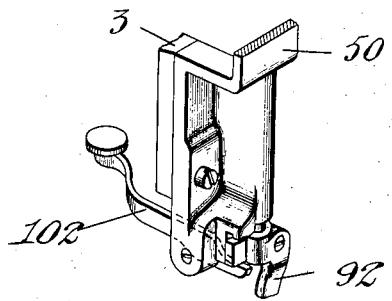
Fig. 16 is a view in perspective showing the presser foot lifting device and associated parts.

A presser foot 92 is provided for holding the work in place while the feeding instrumentalities make their reverse movement. This presser foot at its lower end is formed with a loop-shaped portion 93 opening in the direction of the receding work and with an angularly projecting end 94 which is disposed adjacent to the gage 12 and which extends transversely of the work above the stationary shear block 100 which will presently be described. The presser foot is adjustably secured in place upon the lower end of a spindle 95 arranged to reciprocate vertically in bearings formed in the housing member 50. At its upper end the spindle 95 has a telescopic connection with a rod 96 formed as a part of the cam follower 98. The later receives an eccentric 99 secured to the forward end of the shaft 4, as shown in Fig. 11, by which the presser foot is intermittently elevated during the feeding operation. Between the end of the rod 96 and the bottom of the socket in the spindle 95 in which it slides is a compression spring 97 which renders the action of the presser foot yielding and which may be compressed when the presser foot is elevated to permit the introduction of the work. For this purpose there is pivoted in the lower portion of the housing 50 a finger lever 102 which is arranged at its forward end to take under a shoulder formed on the presser foot 92, as shown in Fig. 16. The presser foot extends across the edge of the work to be folded, alongside the rear of the gage and between the gage and the knife, the mechanism for operating the foot and the height of the gage being such that the foot never rises above the top of the gage. The foot, when lowered, clamps the work in proper relation to the gage and knife substantially all the way along the cut produced by the knife; and when it is raised to permit feeding of the work, it prevents the edge of the work from getting out of proper position with respect to the knife and gage. The overlapping of the foot and gage—that is, the extending of the foot past the gaging face of the gage—prevents rising of the edge of the work over the gage even when the gage has been adjusted to permit a wider fold.

Preparatory to folding the concave edges encountered in the throat of a vamp it is desirable to slit the margin and for this purpose slitting mechanism, now to be described, is provided. The work plate 8 is recessed to receive a block 100 upon the rear side of which is formed a stationary shearing edge and which accordingly constitutes the stationary shearing member. The movable shearing knife 104 is secured to the lower end of a reciprocatory bar 106 arranged for movement in vertical bearings formed in the arm 3. At the upper end of the bar is pivoted a hook-shaped piece 108 which is designed to connect the bar 106 with its actuating mechanism when it is desired to render the sliting knife operative. To this end the piece 108 is forked and shaped to engage the upper end of the rod 96 beneath the follower frame 98 which is cut away for this purpose, having a shoulder to overlie the piece 108 and also a cross pin 109 located beneath the hooked portion of the piece 108 when the latter is in operative position. The bar 106 is bored to receive a spring 209 which acts against a stationary head having a shank 107 extending out through a slot in the bar 106 and set in the arm 3. The spring at its upper end bears against a screw plug 111 in the bar 106 and so tends to elevate the same and hold the knife 104 above the work when the piece 108 is in inoperative position. The piece 108 is moved by the operator through a rod 112 to which it is pivoted, the rod at its rear end being connected to an arm 114 fast on the shaft 115 upon which is loosely journaled the spacing lever 54, see Fig. 4.

The arm 114 is pivotally connected to a rod 64 running to the upper end of a bell crank lever 66 pivoted at the right hand side of the frame 2. The other arm of the bell crank lever 66 is connected to a treadle rod 68 and it will be apparent that when the treadle is depressed the rod 64 and the arm 114 will be moved toward the left thereby moving, or tending to move, the pivoted piece 108 into operative engagement with its actuator and so setting the slitting knife 104 in motion.

When the piece 108 engages with the pin 109 and the shoulder under the cam follower 98 it transmits to the knife carrier bar 106 the positive vertical reciprocation of the follower 98 and while it remains in this position the snipping operation continues. When the treadle is released on the other hand its spring, not shown, will move the rod 64 and the piece 108 toward the right into the inoperative position shown in Fig. 12 and while the piece 108 is in this position the knife remains at rest in its elevated position and the folding operation proceeds without the work being slit. The pivotal connection between the rod 112 and the arm 114 permits the forward end of the rod to swing up and down when the snipping knife is in operation. The rod 112 extends loosely through a block 113 which constitutes its pivotal connection with the arm 114 and is encircled by a compression spring interposed between the block 113 and a collar fast to the rod 112. This construction permits the arm 114 to be moved toward the left at all times regardless of the vertical position of the actuating frame 98. If the treadle is depressed while the piece 108 and the actuator 98 are in the relative positions shown in Fig. 12 the forked end of the piece 108 will be merely pressed yieldingly against the side of its actuator 98 while the spring upon the rod 112 is compressed. As soon, however, as the actuator reaches the upper limit of its stroke the piece 108 will move forwardly into engagement therewith.

It is in some cases desirable to vary the feed alone or the action of the slitting knife and it has already been pointed out how this may be done in the illustrated machine. It frequently happens, however, that it is desired to vary both the feed and the action of the slitting knife at the same time and to this end provision has been made for temporarily locking together the arm 114, which controls the slitting knife, and the spacing lever 54. The shaft 115 to which the arm 114 is secured has at its forward end an upstanding arm 116 which carries a spring pressed locking pin 118 arranged to enter any one of a series of holes 119 in a segment-shaped portion of the spacing lever 54. As shown in Figs. 1 and 4 the locking pin 118 enters that hole in the spacing lever 54 which locks the arm 114 and spacing lever in substantially parallel relation. With this position of parts the depression of the treadle which moves the rod 64 toward the left not only renders the slitting knife operative but also swings the spacing lever 54 in a direction which reduces the extent of the feeding space. Such adjustment is desired by most operators in folding about the throat of a vamp where, on account of the curved edge, it is desired to reduce the feed and slit the work.

When the arm 116 is locked to the spacing lever 54 by engaging the hole 119 farthest to the right, as shown in Figs. 1 and 4, the depression of the treadle will shift the spacing lever to its extreme left hand position corresponding to a minimum feed. The machine in this condition consequently operates with a feed about $\frac{1}{16}$ of an inch and also slits the margin about to be folded. If the arm 116 is locked to the spacing lever by engaging the hole 119 farthest to the left the depression of the treadle will throw the slitting knife into operation as before but will move the spacing lever only a short distance. In this condition the machine will operate with a spacing of about $\frac{3}{16}$ of an inch and also slit the margin to be folded. When the locking pin 118 engages with the intermediate hole 119 the spacing lever may be moved to reduce the feed to about $\frac{1}{8}$ of an inch.

The movement of the spacing lever is limited, when the treadle is depressed as above set forth, by a stop pin 57 which is arranged to be inserted through any one of a number of holes extending transversely through the curved spacing plate 58 above referred to. In this manner therefore the extent of the close spacing or short feed desired may be predetermined by the operator to suit the conditions of the work in hand.

The features above discussed are of particular advantage in operating upon a vamp and in such case the folding operation will be begun at a straight portion of the edge with the machine set in the condition shown in Figs. 1 and 4, that is to say, with the slitting knife inoperative and the spacing lever in position for a maximum feed. The folding operation progresses along the straight edge of the vamp and when the curved throat is reached the operator depresses the treadle swinging the arm 116 and the connected spacing lever toward the left thereby throwing the slitting knife into action and reducing the feed to a minimum. If the vamps being folded should have a very wide curve at the throat the locking pin 118 would be set in one of the holes 119 in the spacing lever farther to the left and under these circumstances when the treadle is depressed, the slitting knife is thrown into operation and the spacing decreased to an intermediate degree.

It will be noted by reference to Fig. 9 that the feed block 26 at its rear edge has a sharp bevel 31 and that the work engaging end of the feed foot 24 has a correspondingly shaped projection. The action of these feeding elements upon the work consequently forms a sharp crease which serves to determine the fold line as the margin is bent upwardly by the plow.

Figure 17:
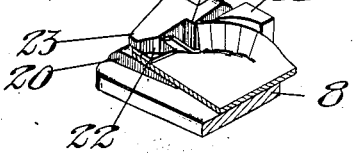
Fig. 17 is a view in perspective illustrating the action of the hammer upon the work.

In introducing work to the machine the presser foot 92 is temporarily elevated by the finger lever 102 and the work placed in the machine with its margin against the gage point 12. It will be noted that the end 94 of the presser foot extends past the rear side of the gage point 12 and in engagement therewith so that there is no possibility of the margin of the work being pushed inwardly over the gage. The presser foot is immediately released and the feed foot 24 comes down upon the body of the work above the feed block 26 and at a point toward the right hand side of the latter, as viewed in Fig. 10. The feet foot is then moved to advance the work the margin of which, as already stated, is creased by the feeding means and turned upwardly by the stationary plow 14. If the slitting knife is in operation the margin is cut into separate tongues before it reaches the plow; otherwise the margin is folded as a continuous piece. After passing the plow the work is engaged by the short portion 21 of the hammer and the fold is stuck down adjacent to its vertex. In the next feeding step the portion of the margin so treated is advanced beneath the longer portion of the hammer by which the fold is completed and pressed as indicated in Fig. 17.

It will be understood that the machine as herein illustrated is particularly adapted for folding closed vamps in accordance with the method of my prior patent above identified. The machine may be used also for folding flat vamps without substantial change although for the convenience of the operator it is proposed to equip the lower arm 3 of the machine with a removable table the surface of which is disposed substantially flush with the surface of the work plate 8.

Certain features herein shown and described, for example an inclined anvil and a connection between the slitting means and the feeding means are described in Patent No. 1,224,529 of May 1, 1917, and Patent No. 1,281,555 of Oct. 15, 1918, both granted on co-pending applications filed in my name, and are claimed broadly in said patents.

Having thus described my invention, what I claim as new and desire to secure by Letters Patent of the United States is:

1. In a machine of the class described, slitting mechanism, intermittent feed mechanism, a member manipulation of which controls the operativeness of the slitting mechanism, a second member manipulation of which varies the extent of the movements of the intermittent feed mechanism, and means for connecting said members in different relative positions to determine the spacing of the slits.

2. In a folding machine, a creaser and a presser of which one is constructed and arranged to feed the work, said presser being shaped to act twice upon the same portion of the work as it is advanced, first near the fold vertex only and then over the full width of the fold.

3. In a machine of the class described, a normally inoperative slitting knife, adjustable feed mechanism normally adapted to produce a predetermined rate of feed of the work, means for simultaneously rendering the knife operative and for varying the rate of feed, and means for connecting the knife and the feed mechanism in different relations to predetermine the extent to which the feed shall be varied when the knife is rendered operative.

4. In a folding machine, folding and feeding instrumentalities, and a presser comprising a short portion having a substantially vertical face lying in a plane parallel to the folded edge of a straght piece of work and arranged to extend only over the edge of the fold, and a long portion having a substantially vertical face lying in a plane oblique to the folded edge of a straight piece and arranged to extend over the entire fold.

5. In a folding machine, folding instrumentalities, a snipping knife, an edge gage, a presser foot extending behind said gage to clamp the work alongside the snipping knife, and means for intermittently raising and lowering said foot.

6. In a folding machine, a snipping knife, an upstanding gage, a presser foot having a portion shaped to bear upon the work between the knife and the gage, and means for raising and lowering said foot intermittently.

7. In a folding machine, an edge gage, a snipping knife, and a presser foot having one portion shaped to bear upon the work at a point behind the edge gage, and another portion shaped to bear upon the work at a point substantially opposite to the slit formed by the knife.

8. In a folding machine, folding instrumentalities and feeding means including an oscillatory bar, a feeding foot fast to the end thereof, a sleeve slidable upon the bar to vary the rate of feed, and means for sliding the sleeve during the operation of the machine.

9. A machine of the class described, having, in combination, work feeding and edge folding instrumentalities, a gage having an operative face against which the edge of the work runs, a presser foot, and means for raising and lowering said foot intermittently to clamp and release the work, said foot having a portion extending past the operative face of the gage in a direction transverse to the line of feed.

10. In a folding machine, a support for the work, feeding and folding instrumentalities, an edge gage rising above the support, a presser foot extending alongside the gage transversely to the line of feed, and means for raising and lowering said foot intermittently, the gage being of sufficient height so that the foot never rises above it.

11. In a folding machine a plow and work feeding and creasing means comprising a lower work feeding member having a beveled work-engaging edge, so located as to form a depression located at the base of one side of the plow, and an upper feed member having a plane face on that side next to the plow and provided with a projection to crowd the work into said depression.

12. In a machine of the class described, slitting mechanism, manually controlled means at all times controllably connected with the slitting mechanism, intermittent feed mechanism including a spacing member adjustable to vary the rate of feed, and means for adjustably connecting the spacing member with the slitting mechanism to vary the spacing of the slits.

13. In a folding machine, feeding and folding instrumentalities including an edge gage, a presser foot extending across the edge of the work to be folded and alongside the rear of the gage to prevent the edge of the work from rising above the top of the gage, and means for intermittently raising and lowering said foot.

14. In a folding machine an upstanding gage adjustable transversely of the line of feed, and a presser foot movable with respect thereto having a portion located close to and overlapping the gage to prevent the edge of the work from rising over the top of the gage irrespective of the adjusted position of the gage.

In testimony whereof I have signed my name to this specification in the presence of two subscribing witnesses.

PERLEY R. GLASS.

Witnesses:
   HERBERT W. KENWAY,
   FRED W. GUIBORD.